United States Patent [19]

Gramlich

[11] Patent Number: 4,568,063
[45] Date of Patent: Feb. 4, 1986

[54] SPRING COMPRESSOR

[76] Inventor: Hans Gramlich, R.R. #6, Orangeville, Canada, L9W 2Y9

[21] Appl. No.: 615,312

[22] Filed: May 30, 1984

[51] Int. Cl.[4] ............................................. B60P 1/48
[52] U.S. Cl. ..................................... 254/10.5; 29/227
[58] Field of Search ...................... 254/10.5, 100, 231; 269/132; 29/225, 227

[56]  References Cited

U.S. PATENT DOCUMENTS

| 721,946 | 3/1903 | Foster | 254/231 |
| 891,121 | 6/1908 | Wichers | 269/132 |
| 1,342,529 | 6/1920 | Charland . | |
| 1,384,969 | 7/1921 | Otsuka . | |
| 2,455,517 | 12/1948 | Nielson | 254/231 |
| 2,652,625 | 9/1953 | Perkins . | |
| 3,051,443 | 8/1962 | Castoe . | |
| 3,070,354 | 12/1962 | Pace . | |
| 3,087,706 | 4/1963 | Van Der Wilt . | |
| 3,132,843 | 5/1964 | Brocato | 254/10.5 |
| 3,237,919 | 3/1966 | MacKay | 254/10.5 |
| 3,341,175 | 9/1967 | Branick . | |
| 3,722,862 | 3/1973 | Dolce . | |
| 3,764,107 | 10/1973 | Mlynarczyk . | |
| 4,036,473 | 7/1977 | Kloster . | |
| 4,061,308 | 12/1977 | Ghent . | |

FOREIGN PATENT DOCUMENTS

| 269542 | 4/1927 | Canada . |
| 508153 | 12/1954 | Canada . |
| 767357 | 9/1967 | Canada . |
| 1049237 | 2/1979 | Canada . |

OTHER PUBLICATIONS

Brochure received at Automechanika (German Trade Show); Frankfurt, Germany; Sep. 14, 1982.
Brochure received at Automechanika (taken from KFZ-Betried (a German Trade Magazine), Frankfurt, Germany; Sep. 14, 1982.

Primary Examiner—Robert C. Watson
Attorney, Agent, or Firm—Merchant, Gould, Smith, Edell, Welter & Schmidt

[57]  ABSTRACT

A spring compressor for axially compressing a helical coil spring of an automobile and then holding the spring in the compressed position consists of two identical devices mounted on opposite sides of the axial spring which is to be axially compressed. Each device comprises metal plates held together by rollers, the plates having curved hook formations to engage a coil of the spring. A threaded spindle fits into a housing capable of pivoting between these metal plates. A chain is threaded around the coils of the spring which is to be compressed and around the rollers between the metal plates. Threaded on the spindle is a chain adjustment piece through which the chain passes and which moves outwardly along the spindle when the spindle is turned, so as to cause the chain to pull the spring and compress the coils of the spring between the loop of chain and the curved hook formations of the metal plates. A pin inserted in the chain adjustment piece locks the chain in the required position so as to prevent the chain from sliding through the chain adjustment piece, thus maintaining the spring in its compressed position.

11 Claims, 3 Drawing Figures

SPRING COMPRESSOR

BACKGROUND DISCUSSION

The present invention relates to a spring compressor which is used to axially compress the helical coil springs of an automobile during the servicing thereof, as, for example, when a shock absorber is to be replaced. A number of patents have been addressed to ways of tightening springs.

Canadian Pat. No. 508, 153 and corresponding U.S. Pat. No. 2,652,625 disclose a plate attachment to a jack which allows the force of the jack to be used to partially compress a coil spring in order that a shim can be inserted. Although the jack is suspended by chains, the chains are not used for tightening purposes. Neither is there disclosed a screw thread tightening mechanism.

Canadian Pat. No. 767, 357 and corresponding U.S. Pat. No. 3,341,175 disclose the use of two grippers of a particular design attached by a bolt member which is tightened to compress a spring. U.S. Pat. No. 3,051,433 similarly involves an arrangement having two gripper members and a bolt therebetween; the shape of one of the grippper members differs from that disclosed in the aforesaid two patents.

Canadian Pat. No. 1,049,237 relates to a locking frame which tightens by means of tightening fitted rods. U.S. Pat. No. 3,070,354 discloses the use of a heavily built cage into which the spring is placed and in which it is then compressed.

U.S. Pat. No. 3,087,706 discloses a spring compressor comprising two or three individual compressors. Each compressor includes a shank having a curved hook formation and a threaded spindle section on which a threaded nut is screwed to engage a sleeve. The spring is compressed between the hook on the end of the shank and the hook on the sleeve as the nut is screwed onto the threads of the shank.

U.S. Pat. No. 3,722,862 shows the use of a chain in a jack and lock combination. The compression is effected by means of a jack which is suitably secured to an anchor and is hooked by a hook to the spring. Provision is made for securing the chain against inadvertant slippage in the jack and lock assembly by the use of a blocking pin inserted through aligned holes in the lock.

U.S. Pat. No. 3,764,107 discloses a compressor with pivotally connected jaws adapted to engage the axially spaced coils of a spring. U.S. Pat. No. 4,036,473 also shows a device with two jaws, which extend into the spring from the side; the two jaws are compressed together by pneumatic cylinders.

U.S. Pat. No. 4,061,308 discloses a device having two retainers, with open sides, which are locked by retainer bars. The two retainers are connected by a jack which is used to compress the springs.

U.S. Pat. No. 1,384,969 shows a device comprising a threaded rod with two jaws screwed on it. The threaded rod is then turned so that the jaws move together to compress the spring. U.S. Pat. No. 1,342,529 shows a similar device, but having parallel linkages and a screw to collapse the jaws instead of having the jaws on the screw thread.

U.S. Pat. No. 2,510,334 shows a device for compressing a number of valve springs simultaneously. It uses lever arms and a threaded rod for tightening.

U.S. Pat. No. 3,982,720 discloses a crank-operated compressor member having two arms which move relative to one another to compress the spring. The prior art discussed by this patent discloses a design wherein two threaded rods with hooks on them, and a wing nut to be tightened on each rod, are used to compress a spring.

Patents have also disclosed the use of a chain being hooked about something which is to be pulled. Canadian Pat. No. 269,542 deals with a wheel puller, for use in taking a wheel or gear from a shaft. The wheel puller has chains which fit around the spokes of the wheel and hook into a puller member. The puller member has a screw threaded through it in the centre, and this bears on the shaft of the wheel. As the screw is turned by a wrench, the chains pull the spokes, thereby moving the wheel off the shaft.

It will be seen that the previously disclosed spring compressors are both more complex and more difficult to use than the device herewith disclosed. Furthermore, unlike some compressors which use interchangeable dies and are therefore limited in the number of springs with which they can be used, this compressor is independent of the size of the coil springs. Use of the disclosed compressor does not require that the strut assembly be taken off the car, thus obviating the need for re-assembly and the consequent wheel alignment. The disclosed compressor is capable of being used in the limited spaces often found about automobile coil springs. The disclosed compressor is also very safe as it cannot slip off the spring when the spring is compressed. The disclosed compressor is inexpensive to manufacture and can be easily operated by the mechanic.

DETAILED DISCLOSURE

Figure 1:
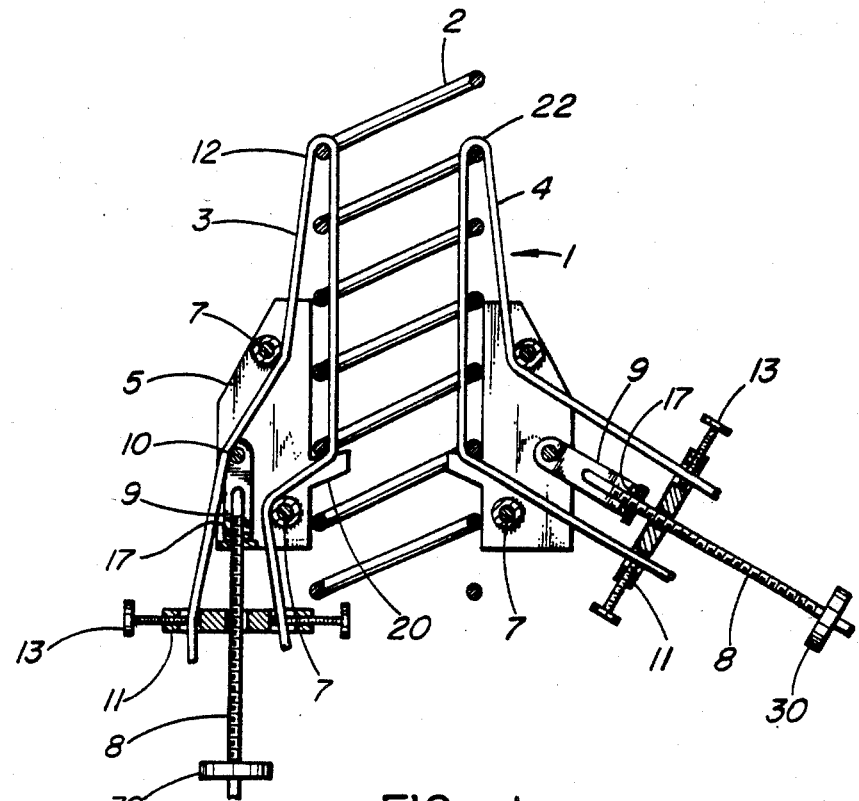
FIG. 1 depicts a front view of the spring compressor.
Figure 2:
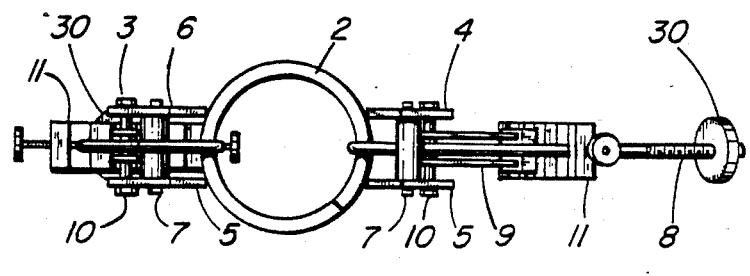
FIG. 2 depicts a top view of the spring compressor.
Figure 3:
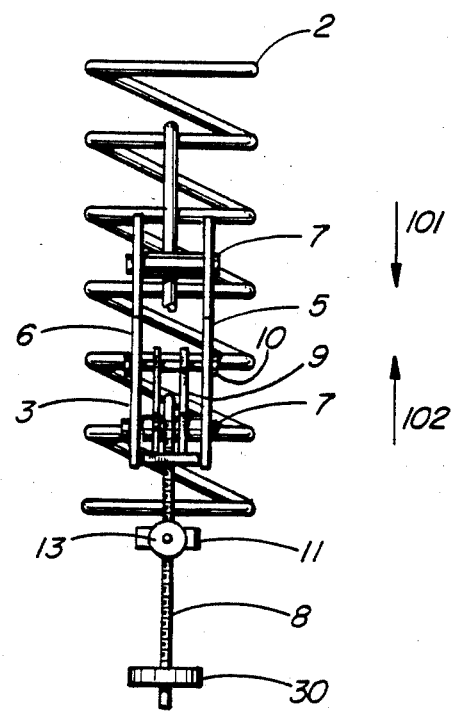
FIG. 3 depicts a side view of the spring compressor.

The preferred embodiment of the invention will now be described in detail.

The spring compressor which is the inventive apparatus is shown generally at 1 with automobile coil spring 2. Two identical devices 3 and 4 including chains 12 and 22, respectively, are used on opposite sides of spring 2 in order to axially compress spring 2. The components and operation of device 3 will be herewith described in detail, it being understood that the same is applicable to device 4.

Device 3 has two spaced parallel metal plates 5 and 6, held together by rollers 7. Metal plates 5 and 6 have thereon curved hook formations 20 and 21, respectively. Chain 12, which can be either a roller chain or a steel cable, fits over rollers 7. Threaded spindle 8 fits through bearing 17 into housing 9, which is capable of pivoting about pivot pin 10 between metal plates 5 and 6. Threaded onto spindle 8 is metal chain adjustment piece 11, through which chain 12 passes. Pin 13 serves as a chain fastener to lock chain 12 into position, so that once pin 13 has been inserted into chain adjustment piece 11, chain 12 cannot slide through chain adjustment piece 11.

In the operation of device 3, chain 12 is threaded around the coils of spring 2 which is to be axially compressed and around rollers 7. Chain 12 is then attached to chain adjustment piece 11. As spingle 8 is turned, chain adjustment piece 11 which is threaded onto spindle 8 moves outwardly along spindle 8 so as to cause chain 12 to pull the looped coil of spring 2 and thus compress the axially spaced coils of spring 2 between the loop of chain 12 and curved hook formations 20 and 21 of metal plates 5 and 6. The axial compression of the coils of the spring occurs in the direction shown by arrows 101 and 102. Nut 30 on the end of spindle 8 permits the use, if desired, of a power drill in order to turn spindle 8. Insertion of pin 13 in chain 12 once the desired spring compression position has been reached prevents chain 12 from sliding through chain adjustment piece 11 and thus maintains spring 2 in its compressed position for as long a period as is necessary.

It is understood that the described operating steps are repeated with device 4, which is positioned on the opposite side of spring 2.

The foregoing has shown and described a particular embodiment of the invention, and variations thereof will be obvious to one skilled in the art. Accordingly, the embodiment is to be taken as illustrative rather than limitative, and the true scope of the invention is as set out in the appended claims.

I claim:

1. Apparatus for axially compressing a helical coil spring and holding the spring engaged thereby in the compressed position, said apparatus consisting of a device comprising:
    spaced parallel plates having curved hook formations thereon adapted for engaging a coil of said spring;
    connecting means for said spaced parallel plates;
    a threaded spindle fitting into a housing between said spaced parallel plates;
    chain adjustment means threaded onto said spindle;
    chain means adapted to be threaded around said connecting means and said coil spring and passing through said chain adjustment means;
    chain fastener means for use with said chain adjustment means.

2. The apparatus of claim 1, wherein said housing is capable of pivoting between said spaced parallel plates.

3. The apparatus of claim 1, wherein said apparatus consists of two of said devices mounted on opposite sides of the coil spring which is to be axially compressed.

4. The apparatus of claim 1, wherein said connecting means are rollers.

5. The apparatus of claim 1, wherein said spindle has threaded thereupon a nut affording means for engagement with a power drive.

6. The apparatus of claim 1, wherein said chain fastener means is a pin inserted in said chain adjustment means.

7. Apparatus for axially compressing a helical coil spring and holding the spring engaged thereby in the compressed position, said apparatus consisting of a device comprising:
    spaced parallel plates having curved hook formations thereon adapted for engaging a coil of said spring;
    connecting means for said spaced parallel plates;
    a threaded spindle fitting into a housing between said spaced parallel plates;
    adjustment means threaded onto said spindle;
    tightening means adapted to be threaded around said connecting means and said coil spring and passing through said adjustment means;
    fastener means for use with said adjustment means.

8. The apparatus of claim 7, wherein said tightening means comprises a steel cable.

9. Apparatus for axially compressing a helical coil spring and holding the spring engaged thereby in the compressed position, said apparatus consisting of a device comprising
    spaced parallel plates having spring engaging means thereon adapted for engaging a coil of said spring;
    connecting means for said spaced parallel plates;
    a housing located intermediate said spaced parallel plates;
    pivot means pivotally connecting said housing to said spaced parallel plates;
    a threaded spindle fitting into said housing;
    adjustment means threaded onto said spindle;
    tightening means adapted to be threaded around said connecting means and said coil spring and passing through said adjustment means;
    fastener means for use with said adjustment means.

10. The apparatus of claim 9, wherein said tightening means comprises a steel cable.

11. The apparatus of claim 9, wherein said tightening means comprises chain means.

* * * * *